US005160516A

United States Patent [19]

Aubry et al.

[11] Patent Number: 5,160,516

[45] Date of Patent: Nov. 3, 1992

[54] ARRANGEMENT FOR SUPPORTING AND GUIDING A CYCLONE SKIRT IN A BOILER HAVING A CIRCULATING FLUIDIZED BED

[75] Inventors: Jean Aubry, Plessis Robinson; André Teton, Villemeux sur Eure; Jean-Paul Tessier, Paris, all of France

[73] Assignee: Stein Industrie, France

[21] Appl. No.: 797,981

[22] Filed: Nov. 26, 1991

[30] Foreign Application Priority Data

Nov. 27, 1990 [FR] France ............................ 90 14807

[51] Int. Cl.[5] ............................ B01D 53/12

[52] U.S. Cl. ............................ 55/269; 55/337; 55/459.1; 55/316

[58] Field of Search ............................ 55/269, 337, 345, 346, 55/349, 415, 447, 316, 459.1

[56] References Cited

U.S. PATENT DOCUMENTS 1,235,174 7/1917 Williams .
3,327,456 6/1967 Guber et al. ............................ 55/269
4,505,051 3/1985 Herchenbach et al. ....... 55/459.1 X

FOREIGN PATENT DOCUMENTS 596236 8/1925 France .
212493 2/1984 United Kingdom .

*Primary Examiner*—Charles Hart
*Attorney, Agent, or Firm*—Sughrue, Mion, Zinn, Macpeak & Seas

[57] ABSTRACT

The present invention relates to an arrangement for supporting and guiding the skirt of a cyclone, and comprising at least three "shoe" components which pass through the cyclone body and the ends of which support the top portion of the skirt. By means of this disposition, the arrangement enables the skirt to be held at its periphery, thereby limiting deformation of the skirt. Preferably, the inner ends of the shoes support the top portion of the skirt via a horizontal annular flange provided on the skirt.

10 Claims, 3 Drawing Sheets

ARRANGEMENT FOR SUPPORTING AND GUIDING A CYCLONE SKIRT IN A BOILER HAVING A CIRCULATING FLUIDIZED BED

The present invention relates to an arrangement for supporting and guiding a cyclone skirt, in particular in a boiler having a circulating fluidized bed.

BACKGROUND OF THE INVENTION

In a boiler having a circulating fluidized bed, gas carrying particles such as ash, sand, coal, etc. is injected into the cyclone where it goes round the skirt which is a cylinder in the shape of a truncated cone. The gas is then rotated around the skirt and the particles fall to the bottom of the cyclone body, with the gas escaping via the skirt. The temperature inside the cyclone may reach about 900° C., and the skirt may be about 4 meters in diameter and weigh up to about 4 tonnes (i.e. metric tons).

Currently, in certain dispositions, the cyclone skirt is simply placed via an annular flange on the shoulder which is formed at the top of the cyclone body and which is made of refractory material.

Due to the forces exerted on the skirt and to the high and possibly variable temperature prevailing in the cyclone, the skirt and in particular its support flange tend to be deformed, and the weight of the skirt is then no longer transmitted uniformly to the supporting refractory material. When thus subjected to too much force, the refractory material splits and then breaks, thereby bringing the skirt into a wrong position where it tilts, and, in extreme cases, even leading to the skirt falling off.

U.K. Patent G.B. 2 124 932 describes a cyclone skirt arrangement designed to solve the problems of dismounting the skirt and of deformation due to thermal stress. To this end, the skirt is divided into independent segments supported at their tops in detachable manner by parts welded to the wall of the cyclone or by direct bolting.

An object of the present invention is to solve these problems by providing an arrangement for both supporting and also guiding a one-piece skirt without the skirt being supported directly on the refractory material.

SUMMARY OF THE INVENTION

To this end, the present invention provides an arrangement for supporting and guiding the skirt of a cyclone in particular in a boiler having a circulating fluidized bed, said arrangement being remarkable in that it comprises at least three metal "shoe" components which pass through the cyclone body, which are evenly distributed around the periphery of the cyclone body in a horizontal plane, and which have their inner ends supporting the top portion of the skirt by means of a horizontal annular flange provided on the skirt and bearing against the shoes.

By means of this disposition, the arrangement enables the skirt to be held at its periphery, thereby limiting deformation of the skirt.

A sufficient number of shoes disposed in this way in a ring, serve to hold the top portion of the skirt at its periphery. To this end, there are at least three shoes.

In a preferred embodiment, the shoes are radially retractable. In addition, the radial depth to which each shoe can be inserted into the cyclone may be adjustable. This makes it possible to adjust the position of the axis of the skirt.

To this end, each shoe may be disposed inside a sleeve which is secured to the metal casing of the cyclone body.

In this way, it is possible to withdraw the shoes and thus to disassemble the skirt by lifting it upwards so as to remove it or replace it.

In a particular embodiment, the inner ends of the shoes are inserted in housings provided in the top portion of the skirt. This enables the skirt to be positioned accurately, since each shoe corresponds to a housing provided in the top portion of the skirt.

The housings provided in the top portion of the skirt are formed by a second horizontal annular flange provided in the top portion of the skirt and by vertical spacers disposed between the two flanges.

By means of these housings, the skirt can be positioned relatively accurately, while giving the shoes a certain amount of clearance in their housings.

Preferably, each shoe has a hollow structure reinforced by internal walls; the internal walls may be arranged in a baffle, each shoe having inlet and outlet orifices designed to allow a cooling fluid to flow therethrough; and preferably, the cooling fluid is either air or water.

A function of the internal walls is to reinforce and stiffen the shoes so that they have sufficient bearing properties.

In order to perform sealing between the skirt and the refractory material of the cyclone body, it is possible to provide a sealing device constituted by ring segments fixed on the top flange of the skirt and inserted in packing made of refractory material housed in the cyclone body; and preferably, the ring segments are made of refractory material.

BRIEF DESCRIPTION OF THE DRAWINGS

An embodiment of the invention is described by way of example with reference to the accompanying drawings, in which.

DETAILED DESCRIPTION

Figure 1:
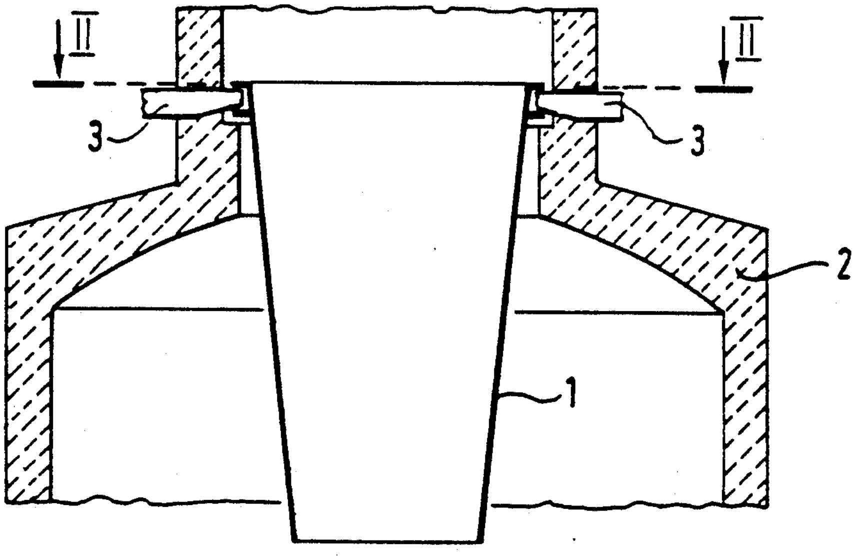
FIG. 1 is a vertical section view on I—I of FIG. 2, diagrammatically showing skirt supporting apparatus of the invention.

FIG. 1 is a diagram showing the skirt 1, the cyclone body 2 and two preferably metal support components 3 for supporting the skirt. The support components referred to below as "shoes" pass through the wall of the cyclone body and are housed between two annular flanges provided at the top of the skirt 1. The shoes 3 are retractable as is explained below.

Figure 2:
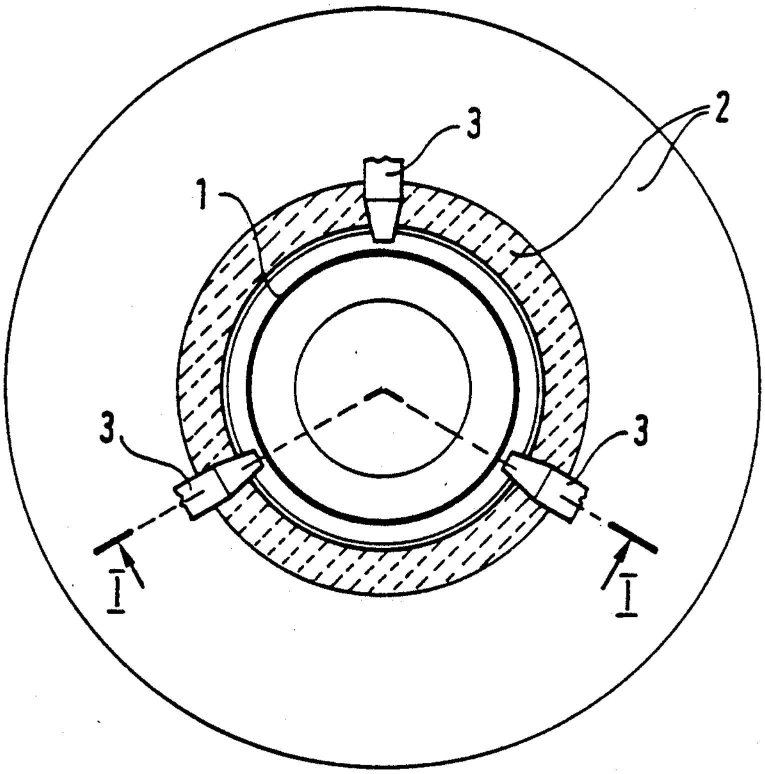
FIG. 2 is a horizontal section view on II—II diagrammatically showing apparatus of the invention.

FIG. 2 is a horizontal section showing the arrangement of three shoes 3 evenly distributed around the periphery of the skirt 1. Preferably, there are three shoes 3, but more than three shoes 3 could be provided.

Figure 3:
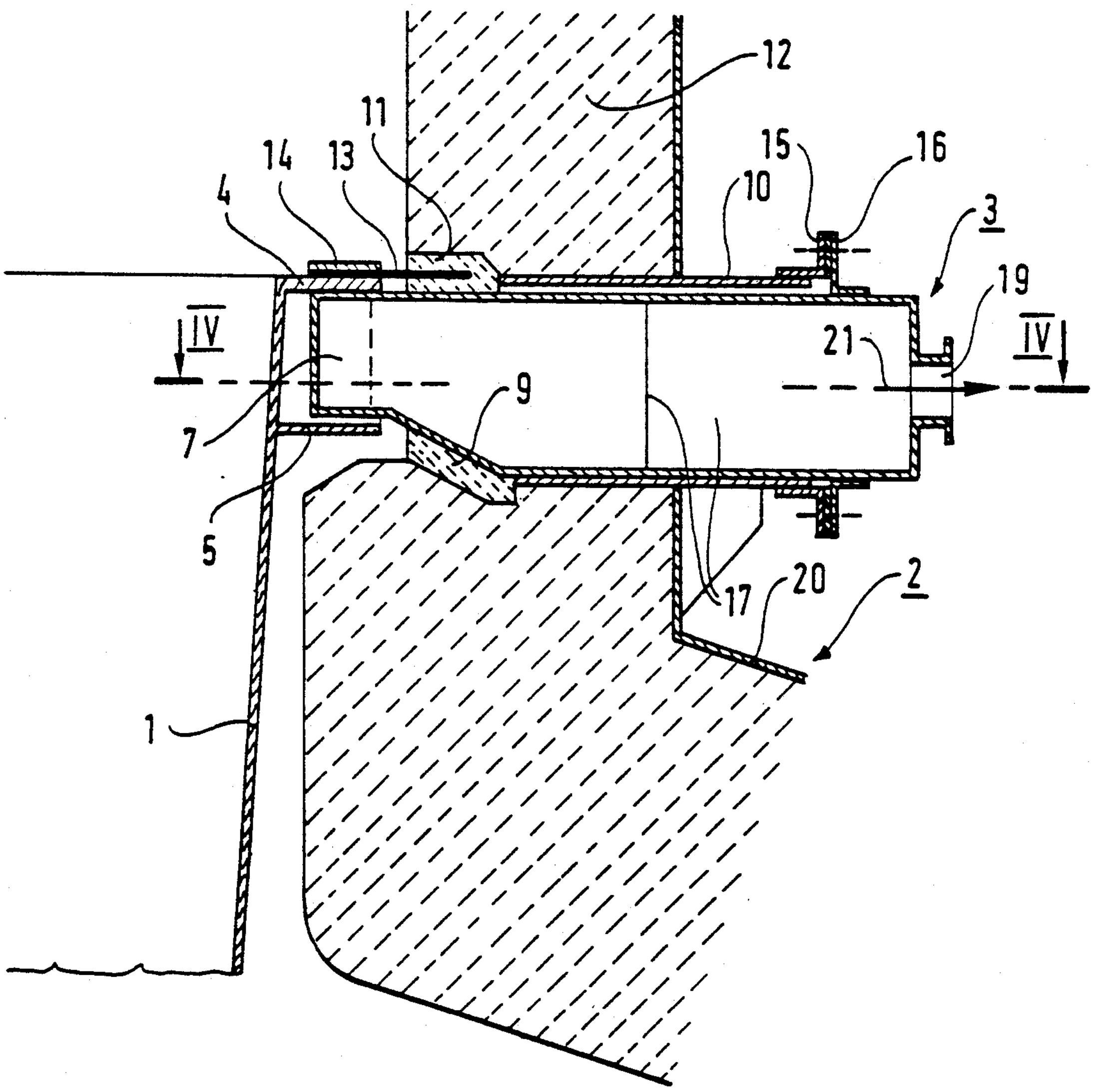
FIG. 3 is a vertical section view on III—III showing a detail of apparatus of the invention.
Figure 4:
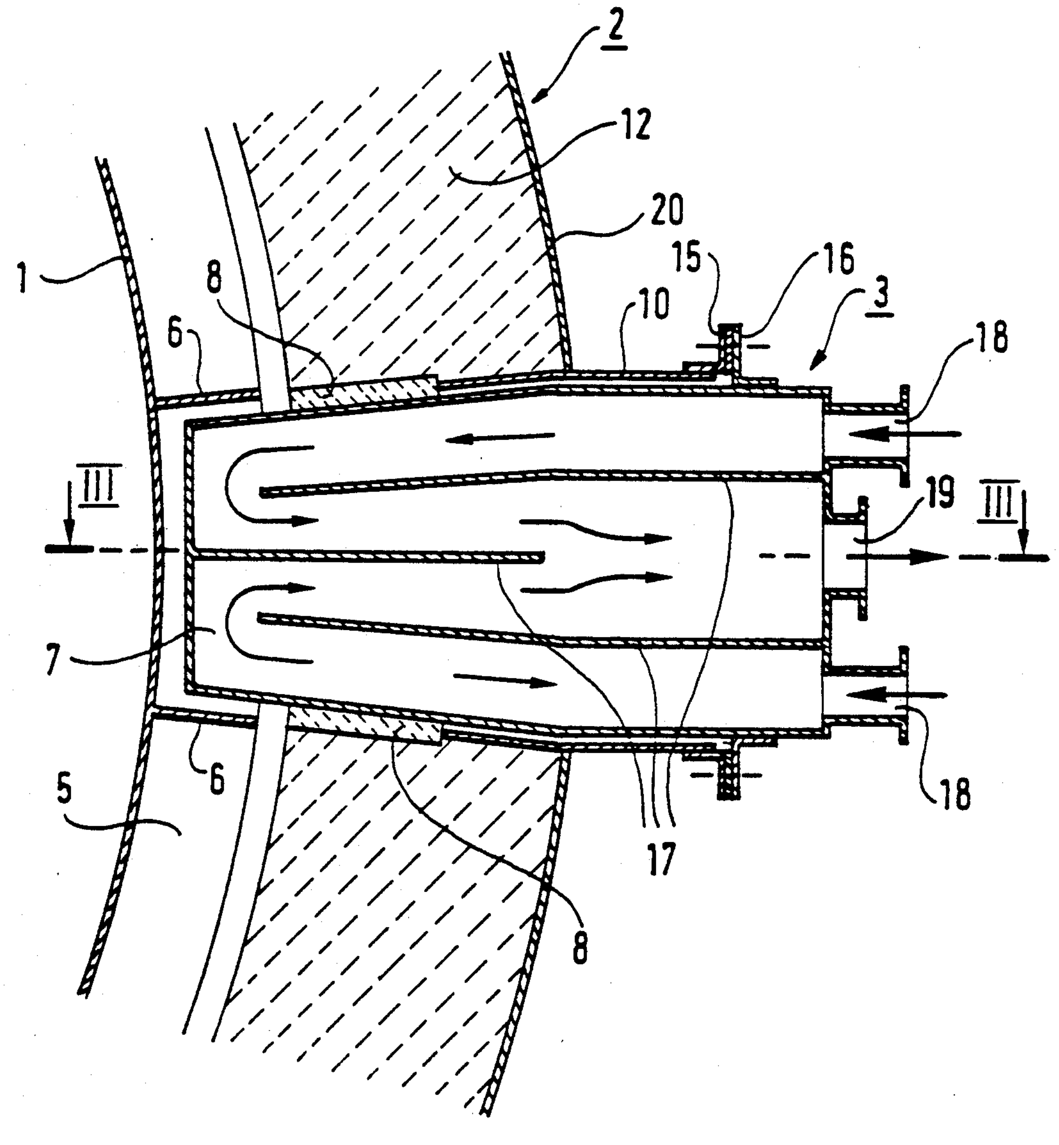
FIG. 4 is a horizontal section view on IV—IV of the same detail of apparatus of the invention.

FIGS. 3 and 4 are detail views showing a shoe 3 and the corresponding arrangement of the cyclone body 2 and of the skirt 1.

The top of the skirt 1 has two annular flanges, one being a top flange 4 and the other, bottom flange 5 being situated underneath the top flange. Vertical spacers 6 FIG. 4, are provided between the two flanges 4, 5 to define a housing designed to receive the radially inner end 7 of the shoe 3. Naturally, such housings are provided in positions that correspond to the positions of the shoes 3 and there are the same number of housings as there are shoes.

In a simpler arrangement which is not shown, the skirt has only a top annular flange 4 bearing against the shoes 3.

The shoe 3 is constituted by a hollow metal part which, in a horizontal plane, has tapering side walls reducing its sectional area so as to facilitate removing it.

The shoe 3 is supported and guided by a preferably metal sleeve 10 which is secured to the metal casing 20 of the cyclone body 2. The shoe 3 therefore rests on the bottom portion of the sleeve 10.

Sealing components 8, 9, 11 are installed at the end of the sleeve 10 inside the cyclone. The components 8, 9, 11 are made of flexible insulating refractory material.

At the level of the top packing 11, sealing is also performed between the skirt 1 and the refractory material 12 of the cyclone body by means of juxtaposed ring segments 13. The ring segments 13, preferably made of refractory fibers, are inserted in the packing 11 and are fixed to the top flange 4 of the skirt 1. This is preferably done by bolting them onto the flange 4 with a reinforcing part 14 being interposed.

A metal flange 15 is fixed, preferably by welding, around the entire periphery of the radially outer end of the sleeve 10. This flange 15 serves as an abutment via an interposed gasket with a flange 16 fixed, preferably by welding, on the periphery of the shoe 13. The abutment between the flanges 15 and 16 defines the position in which the shoe 3 is fully inserted into the housing provided in the skirt 1. In this position, the shoe 3 is fixed to the sleeve 10, preferably by bolting the flanges 15 and 16 together.

By unbolting the flanges 15 and 16, the shoe 3 is released from the sleeve 10, and the shoe 3 can be radially removed from the body 2 in the direction of arrow 21.

Once all the shoes 3 have been removed, and the ring segments 13 have been disassembled by unbolting, the skirt 1 can be released by lifting it upwards by means of a hoist or another system, so as to remove it or replace it.

By means of spacers 21 interposed between the flanges 15 and 16, it is possible to change the extent to which the various shoes 3 are inserted. In this way, the position of the skirt and in particular the position of the axis of the skirt can be adjusted. By acting on the various shoes, it is therefore possible to center the skirt almost.perfectly. If need be, it is also possible to adjust the skirt so that it is off-center relative to the axis of cyclone body 22.

The internal structure of the shoe 3 may be seen clearly in FIG. 4.

Vertical walls 17 are arranged in a baffle inside the hollow metal shoe.

These walls 17 perform two functions. They define a baffle circuit designed to convey a cooling fluid inside the shoe 3.

To this end, the radially outer end of the shoe 3 has a suitable number of orifices (three in the embodiment shown) consisting of two inlet orifices 18 and one outlet orifice 19. The cooling fluid is therefore sent in under pressure via the orifices 18 and leaves via the orifice 19.

The cooling fluid may be cold air or water, for example. In the event that dry air is used, this air may optionally be injected into the cyclone.

The walls 17 also perform the function of reinforcing the structure of the shoe 3, by forming stiffening ribs.

We claim:

1. An arrangement for supporting and guiding a unitary skirt of a cylindrical cyclone body of a boiler having a circulating fluidized bed, said arrangement comprising at least three metal shoes mounted on said body and passing radially through the cyclone body, which shoes are evenly distributed around the periphery of the cyclone body in a horizontal plane, and said shoes having inner ends supporting the top portion of the skirt by means of a first, horizontal annular flange provided on the skirt, extending completely about the outer periphery of said skirt and bearing solely vertically against the shoes, and means for varying the radial depth of each shoe to effect radial displacement of the skirt.

2. An arrangement according to claim 1, wherein the shoes are retractable from the outside of the cyclone body.

3. An arrangement according to claim 2 wherein each shoe is disposed inside a sleeve which is fixedly secured to the metal casing of the cyclone body.

4. An arrangement according to claim 1, wherein the ends of the shoes are inserted in housings provided in the top portion of the skirt, said housings being slightly larger than the ends of said shoes received thereby.

5. An arrangement according to claim 4, wherein the housings provided in the top portion of the skirt are formed by said first flange and by a second horizontal annular flange provided in said top portion of the skirt and spaced axially from said first flange, and by vertical spacers disposed between the two flanges.

6. An arrangement according to claim 1, wherein each shoe comprises a hollow structure reinforced by internal walls.

7. An arrangement according to claim 6, wherein the internal walls extend radially and are spaced from each other to form a baffle, each shoe having at least one inlet and outlet orifice for circulating a cooling fluid through said baffle.

8. An arrangement according to claim 1, wherein a sealing device is provided between the skirt and the refractory material of the cyclone body.

9. An arrangement according to claim 8, wherein the sealing device is constituted by ring segments fixed on the top flange of the skirt and inserted in packing made of refractory material housed in the cyclone body.

10. An arrangement according to claim 9, wherein the ring segments are made of refractory material.

* * * * *